No. 611,492. Patented Sept. 27, 1898.
A. W. KNEE & J. W. ROBINSON.
EIGHT HORSE EVENER.
(Application filed Dec. 21, 1897.)
(No Model.)
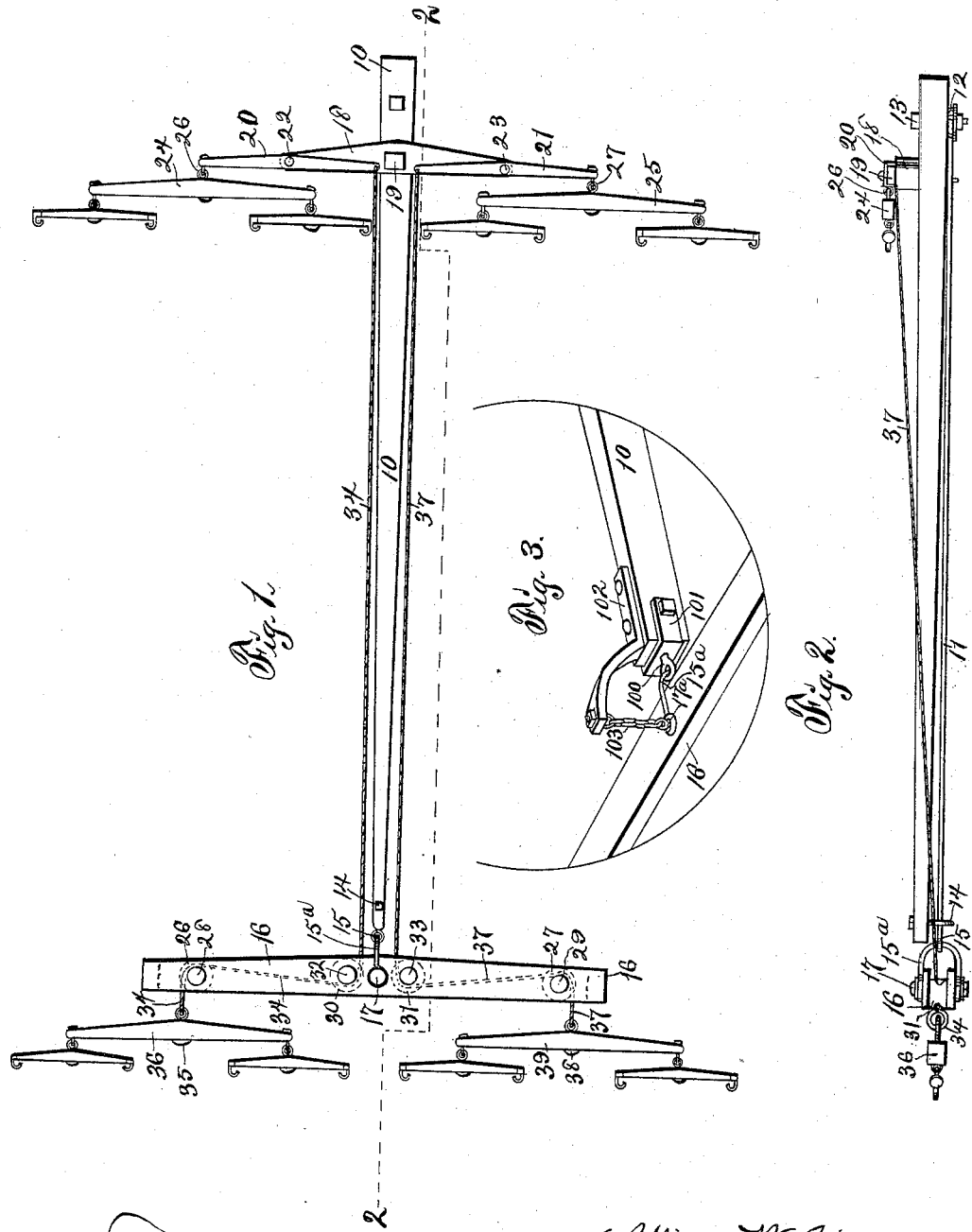

UNITED STATES PATENT OFFICE.

ALLISON W. KNEE AND JAMES W. ROBINSON, OF HUMBOLDT, IOWA; SAID KNEE ASSIGNOR TO H. S. SANDERS, OF FORT DODGE, IOWA.

EIGHT-HORSE EVENER.

SPECIFICATION forming part of Letters Patent No. 611,492, dated September 27, 1898.

Application filed December 21, 1897. Serial No. 662,962. (No model.)

*To all whom it may concern:*

Be it known that we, ALLISON W. KNEE and JAMES W. ROBINSON, citizens of the United States of America, and residents of Humboldt, State of Iowa, have invented a new and useful Eight-Horse Evener, of which the following is a specification.

The object of this invention is to provide means for attaching two teams, or four horses, each in the same line of travel, balancing the draft of a pair of horses in each team against the draft of the other pair of horses of said team, balancing the draft of a pair of horses in one team against the draft of the pair of horses in the other team in traveling alinement therewith on each side of the draft-center, and arranging the several draft-points in such relations that each horse will pull a like amount of the load and be balanced against each other horse of the teams.

Our invention consists in the construction, arrangement, and combination of elements hereinafter set forth, pointed out in our claims, and illustrated by the accompanying drawings, in which—

Figure 1 is a plan, and Fig. 2 is a sectional elevation, of the device, both views showing our device attached to a draft-tongue. Fig. 3 is a perspective showing a modified form of clevis attachment.

In the construction of the device as shown the numeral 10 designates a draft-tongue which may be mounted on and attached to any vehicle or machine to be transported by animal power. A draft-rod 11 is provided of a length approximating to the length of the draft-tongue, which draft-rod has an eye 12 formed on its rear end and inclosing a bolt 13, vertically positioned in and transversely of the rear end portion of the tongue. The forward portion of the draft-rod 11 extends through an eyebolt 14, which eyebolt is positioned vertically in and transversely of the forward end portion of the draft-tongue and has its eye extended below said tongue, the axis of said eye being parallel with the longitudinal axis of the tongue. An eye 15 is formed on the forward end portion of the draft-rod 11, and the axis of said eye is vertical. A clevis 15ª, of common form, is hooked through the eye 14 of the draft-rod, and a long evener-bar 16 is pivoted to said clevis by a clevis-pin 17, located at the center of and extended vertically through the long evener-bar. A bar 18, which for convenience we will term an "axial" evener-bar, is mounted on the rear end portion of the draft-tongue 10 by means of a pin or bolt 19, traversing the center of the bar and extended through the tongue. Short evener-bars 20 21 are pivoted on the opposite end portions of the axial evener-bar 18 and above the same by means of pins or bolts 22 23, traversing the centers of the short evener-bars and the end portions of the axial evener-bar in vertical planes. Attention is here called to the fact that the long evener-bar 16 is of a length approximating to the extreme length of the axial evener-bar combined with the projecting portions of the small evener-bars 20 21.

Doubletrees 24 25 are secured by clevises 26 27 to the outer end portions of the short evener-bars 20 21. The doubletrees are mounted in the horizontal plane with the short evener-bars and are each provided with two singletrees. The evener-bars 20 21 are of the same length and are of slightly less length than the axial evener-bar. The doubletrees 24 25 are of the same length and are of approximately the same length as the axial evener-bar. The long evener-bar 16 is horizontally slotted longitudinally from near one end thereof nearly to the other end, and sheaves 26 27, as shown by dotted lines in Fig. 1, are mounted on pins or bolts 28 29, which pins or bolts are seated in and transversely of the end portions of the long evener-bar, the sheaves being located within the slot of said bar. Sheaves 30 31 are located in the slot of the long evener-bar 16 on either side of and adjacent to the center of draft, or, more properly speaking, the center line of draft, and are arranged for rotation on pins or bolts 32 33, mounted vertically in and transversely of the long evener-bar. The sheaves 30 31 also are shown by dotted lines in Fig. 1, and the sheave 31 is shown in solid lines in Fig. 2 in elevation. A draft-cable 34 is connected at its rear end to the inner end portion of the short evener-bar 20, is extended forwardly and slightly downward to and rove through and in front of the sheave 30, is extended outwardly through and along the slot in the long evener-bar 16, and is rove through and in the rear of the sheave 26, and is extended forwardly therefrom a short distance to a point of attachment to a clevis 35 on a doubletree 36, which doubletree is provided with singletrees. A draft-cable 37 is connected at its rear end to the inner end of the short evener-bar 21, is extended forward and slightly downward to and is rove through and in front of the sheave 31, is extended outwardly and along the slot in the long evener-bar 16, is rove through and at the rear of the sheave 27, and is extended forwardly therefrom a short distance to a point of attachment to a clevis 38 on a doubletree 39, which doubletree also is provided with singletrees. The doubletrees 36 39 are of the same length as the doubletrees 24 25. In practical use the draft of the doubletrees 36 39 is divided between two lines of draft, the one acting through the long evener-bar 16 and the draft-rod to the tongue and the other acting through the draft-cables, short evener-bars, and axial evener-bar to the tongue. Thus it will be seen that a portion of the draft of the front team and all of the draft of the rear team hinges on the axis of the axial evener-bar, that a portion of the draft of each pair of the front team hinges upon the remaining pair of the front team, while the remaining portion of said draft acts against one of the pairs of the rear team and hinges on the axes of the short evener-bars 20 21.

In the form shown in Fig. 3 an eye 100 projects forwardly from an angle-plate 101, bolted to the forward end of the tongue 10, and the clevis 15$^a$ is run through said eye and connected pivotally to the long evener-bar 16 by an eye-pin 17$^a$. An arched bracket 102 is fixed to and projects forwardly and upwardly from the front end of the tongue 10 and is connected at its front end to the eye-pin 17$^a$ by a chain 103, which chain is in a vertical plane and serves to support the bar 16 when the draft of the forward team is slackened.

We claim as our invention—

1. In an evener a lever whereby one pair of draft-animals is balanced against another pair abreast thereof, another lever whereby the draft of one pair of animals is balanced against another pair abreast thereof and cable connections between said levers whereby the draft of one set of animals is balanced against the draft of another set of animals in traveling alinement therewith.

2. An eight-horse equalizer in combination with a draft-tongue, which equalizer comprises an axial evener-bar centrally pivoted on the rear end portion of the tongue, short evener-bars axially pivoted on the end portion of the axial evener-bar, doubletrees attached to the opposite and extreme ends of the short evener-bars, a draft-rod having an eye, a long evener-bar slotted longitudinally and horizontally and axially attached to said eye of the draft-rod, draft-cables attached at their rear ends to the inner or mean ends of the short evener-bars, sheaves mounted for rotation in the slot of the long evener-bars, through which sheaves the forward end portions of the draft-cables are rove, and doubletrees attached axially to the forward end portions of the draft-cables and in front of the long evener-bar.

3. In a device of the class described a long evener-bar slotted longitudinally horizontally, sheaves 26, 27, mounted for rotation in the end portion of the slot of the long evener-bar, sheaves 30, 31, mounted for rotation adjacent to each other in the slot and near the axis of the long evener-bar, draft-cables fastened back at their rear ends and extending between and in opposite directions in front of the sheaves 30, 31, also extending along the slot in opposite direction to and in the rear of and around the sheaves 26, 27, and also extending forwardly in parallel planes from the sheaves 26, 27, to a point of attachment to doubletrees.

4. The combination of a tongue, an eye on the forward end thereof, a clevis in said eye, an evener-bar, an eye-pin pivotally connecting said clevis and evener-bar, an arched bracket 102 fixed to said tongue and a chain connecting said arched bracket and eye-pin.

ALLISON W. KNEE.
JAMES W. ROBINSON.

Witnesses:
H. H. CLARK,
B. J. GRENNELL.